H. KOCOUREK.
OIL FEED INDICATOR.
APPLICATION FILED AUG. 26, 1914.
1,234,774.
Patented July 31, 1917.
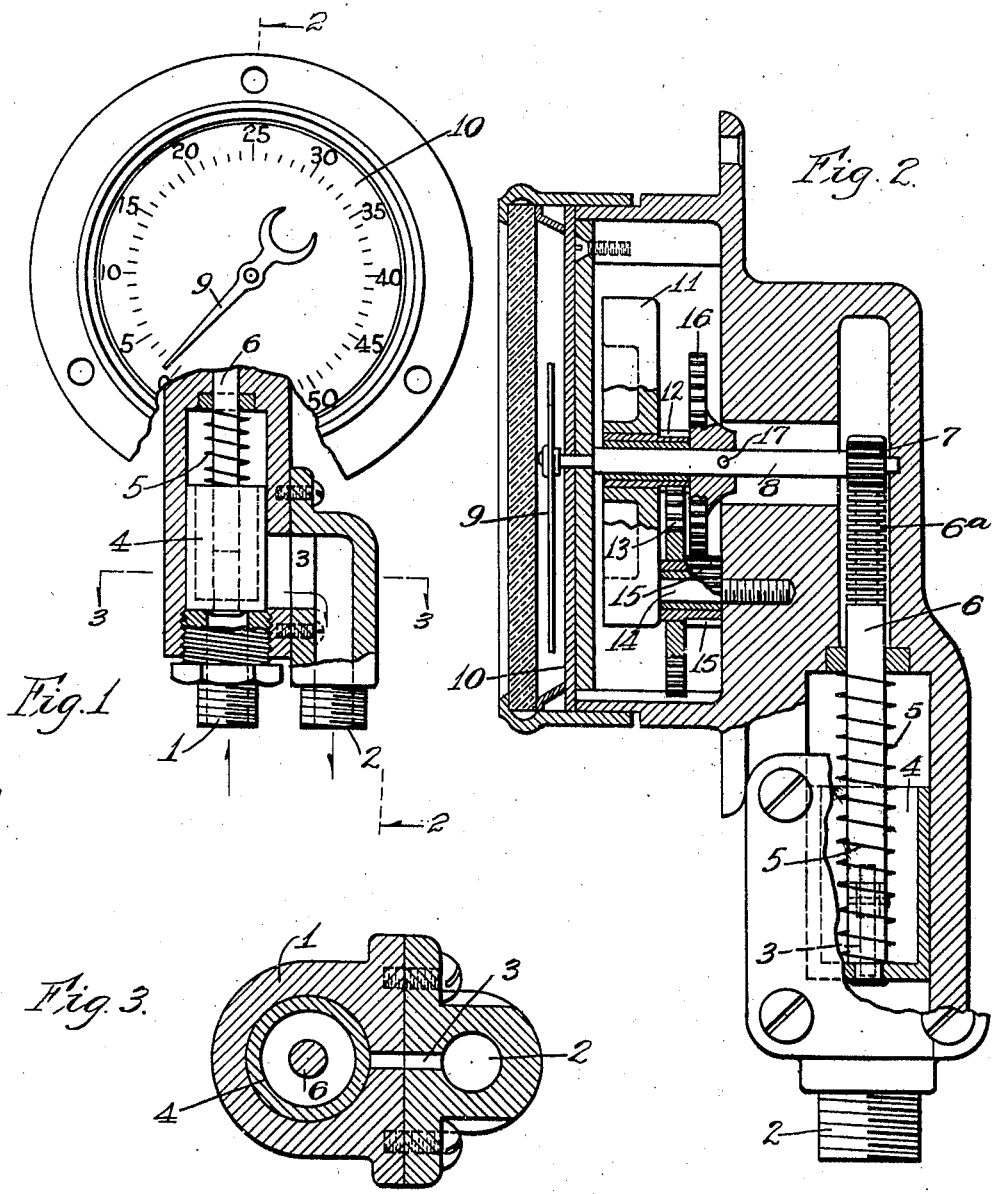

UNITED STATES PATENT OFFICE.

HENRY KOCOUREK, OF CHICAGO, ILLINOIS, ASSIGNOR TO STEWART-WARNER SPEEDOMETER CORPORATION, OF CHICAGO, ILLINOIS, A CORPORATION OF VIRGINIA.

OIL-FEED INDICATOR.

1,234,774.      Specification of Letters Patent.      Patented July 31, 1917.

Application filed August 26, 1914. Serial No. 858,747.

*To all whom it may concern:*

Be it known that I, HENRY KOCOUREK, a citizen of the United States, residing at Chicago, in the county of Cook and State of Illinois, have invented new and useful Improvements in Oil-Feed Indicators, of which the following is a specification, reference being had to the accompanying drawings, forming a part thereof.

The purpose of this invention is to provide an instrument adapted to indicate the rate of flow of a fluid through a conduit and particularly designed for use where such flow is of a pulsating nature. It consists of the features and elements described and shown in the drawings as indicated by the claims.

In the drawings:—

Figure 1 is a front elevation of an instrument embodying this invention, certain of the working parts being shown in section.

Fig. 2 is principally a section taken as indicated at the line 2—2 on Fig. 1.

Fig. 3 is a detail section taken as indicated at the line 3—3 on Fig. 1.

The instrument shown in the drawings is particularly designed for indicating the rate of flow of oil in a circulatory lubricating system, especially where circulation is maintained by a pump which is liable to cause more or less pulsation in the fluid itself. The instrument is designed to be connected in series so to speak in the circulatory system so that all the oil flowing through the system will be passed through the instrument. For this purpose it is provided with an intake pipe, 1, and an outlet pipe, 2, between which communication is afforded through a restricted passage, 3, which is normally closed by a piston, 4, acting as a gate valve. The piston, 4, is slidably mounted in the pipe, 1, and is yieldingly held toward its lower limit of movement by means of a spring, 5, coiled about its stem, 6. The upper end of the stem is formed with gear teeth, 6ª, constituting a rack meshing with a pinion, 7, which is fast on a shaft, 8, carrying at its opposite end an indicating needle, 9. It will be seen that the height to which the piston, 4, will be raised by the liquid entering the pipe, 1, will depend upon the rate of flow which is being maintained in the circulating system, and this height may be indicated in terms of the quantity of liquid flowing through the instrument in any selected unit of time by position of the needle, 9, upon a properly graduated dial, 10, That is, to maintain a given rate of flow through the system a certain pressure or head of liquid must be maintained by the pump, and this pressure operating upon the piston, 4, will indicate at the dial, 10, as for example, in terms of gallons per hour, the rate at which the liquid is being circulated through the system.

But since such circulation is generally maintained by means of a reciprocating or otherwise intermittent pump, the impulses of the pump will be transmitted through the liquid causing a fluctuating pressure and tending to vibrate the indicating needle, 9, thus rendering it difficult to ascertain the actual average pressure and the actual rate of flow. To absorb the vibration thus introduced into the instrument there is provided a special mechanism comprising the balance wheel, 11, journaled loosely upon the shaft, 8, and having rigid with it a pinion, 12, meshing with a considerably larger gear, 13, journaled upon a stud, 14, fixed in the casing of the instrument. The gear, 13, also has rigid with it a smaller pinion, 15, meshing with a larger gear, 16, which is fixed as by a pin, 17, to the shaft, 8. Thus any rotation of the shaft, 8, would cause rotation of the balance wheel, 11, at a much higher velocity. But because the comparatively heavy balance wheel, 11, is geared up from the shaft, 8, and the stem, 6, the pulsations acting through the liquid upon the piston, 4, will not be sufficient to overcome the inertia of the balance wheel back-geared in this manner to the piston, and this inertia will thus operate to absorb these pulsations, preventing fluctuation in the position of the piston, 4, and thus preventing vibration of the needle, 9. The mechanism will not prevent the instrument from responding to an actual variation in the average pressure of the fluid but will simply enable the needle to furnish a true indication of the average pressure, whatever that may be.

I claim:—

1. In an instrument having a pressure sensitive member and an indicating member operatively connected thereto, a damping device comprising a fly wheel relatively heavy as compared with the indicating member, and a speed multiplying train operatively connecting said fly wheel with the pressure sensitive member for causing comparatively rapid movement of said fly wheel during slow movement of the pressure sensitive member and its connected indicating means.

2. An instrument for the purpose indicated comprising an inlet conduit, an outlet, a port for affording communication between them, a piston in the inlet conduit positioned to control said port, yielding means tending to hold said piston in position to close the port in opposition to the pressure of incoming fluid, and relatively light indicating means operatively connected to said piston, together with a relatively heavy fly wheel, and speed multiplying gearing connecting it with the piston adapted to cause comparatively rapid movement of said fly wheel during slow movement of the piston and its connected indicating means whereby said fly wheel serves as a damper for the piston and said indicating means.

3. An instrument for the purpose indicated comprising an inlet conduit, an outlet, a port for affording communication between them, a piston in the inlet conduit positioned to control said port, yielding means tending to hold said piston in position to close the port in opposition to the pressure of incoming fluid, a rack gear connected to the piston, a pinion journaled to mesh with said rack, a shaft for said pinion, a graduated dial, and an indicating needle fixed to said shaft in position to traverse the dial, together with a fly wheel loosely mounted on the shaft, and speed-multiplying gearing from the shaft to the fly wheel whereby the inertia of said wheel is adapted to resist acceleration of the shaft.

In testimony whereof I have hereunto set my hand at Chicago, Illinois, this 24th day of August, 1914.

HENRY KOCOUREK.

Witnesses:
ROBT. N. BURTON,
EDNA M. MACINTOSH.